June 19, 1934.   P. BARTHELEMY   1,963,880
FRICTION OPERATED MECHANISM
Filed Dec. 18, 1930   3 Sheets-Sheet 2
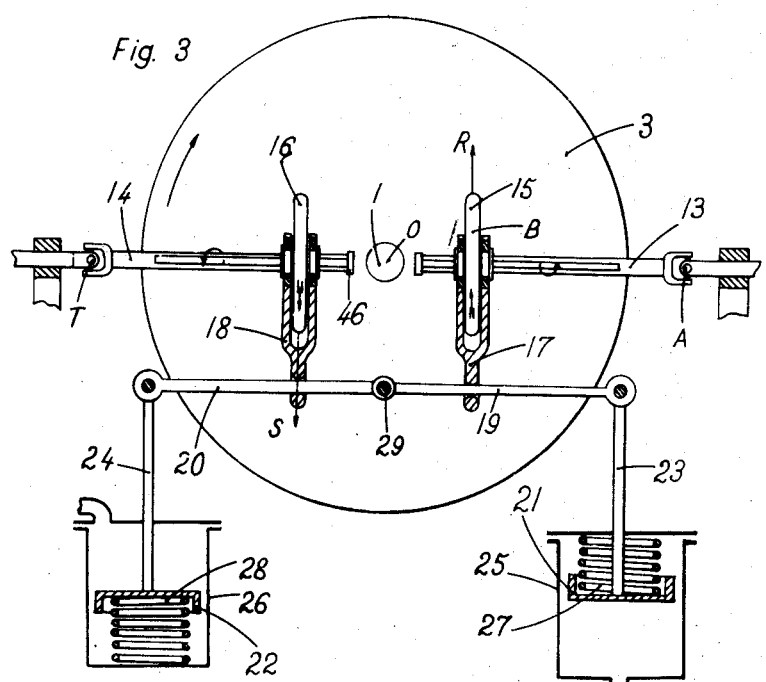
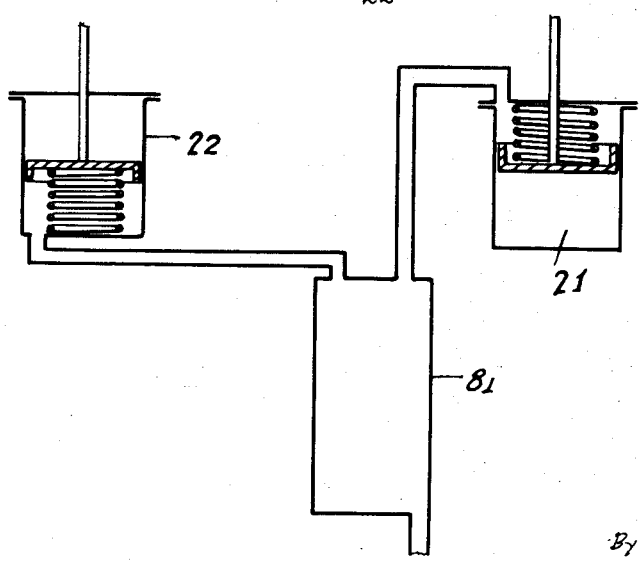
P. Barthelemy
INVENTOR
By Marks & Clerk
ATTYS.

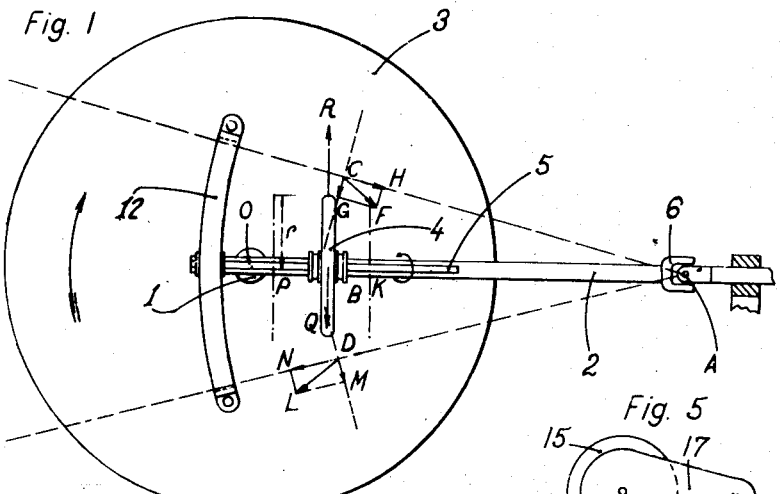
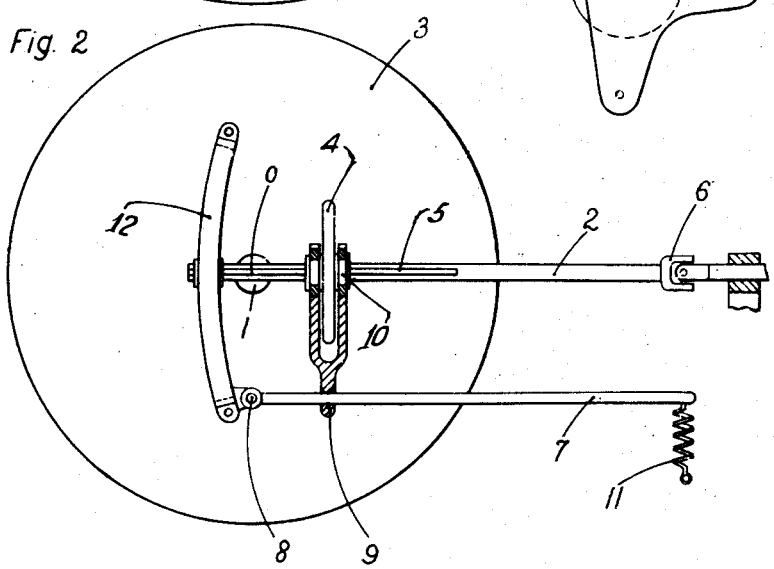
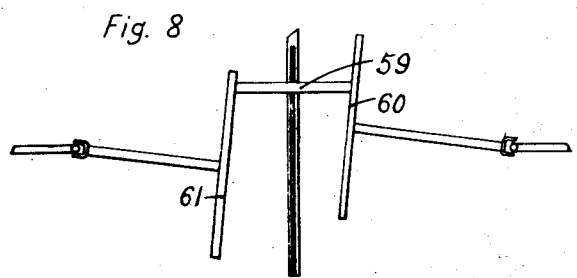

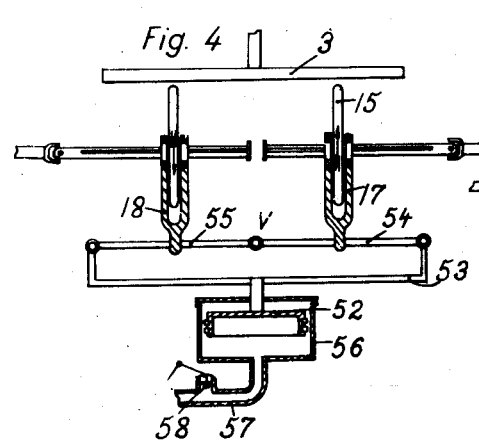
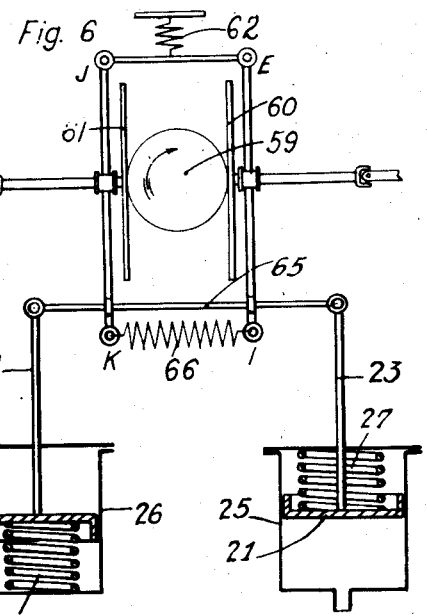
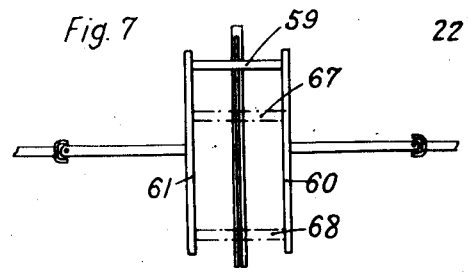
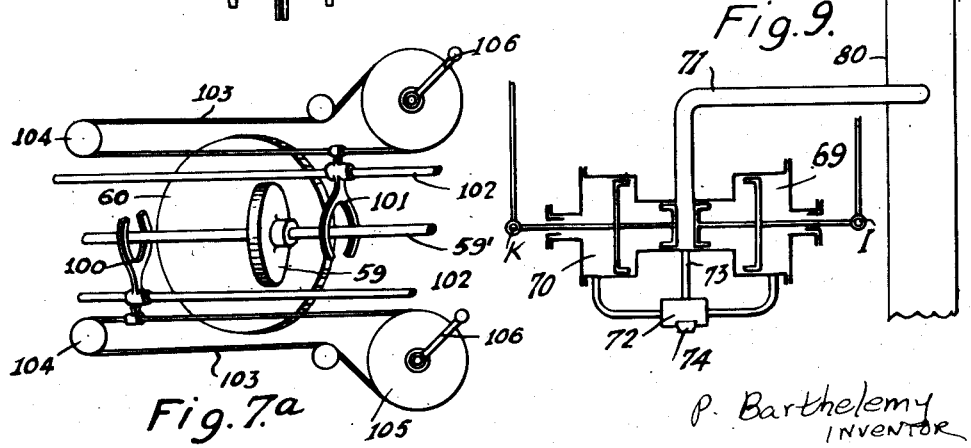

Patented June 19, 1934

1,963,880

UNITED STATES PATENT OFFICE 1,963,880

FRICTION OPERATED MECHANISM

Pierre Barthelemy, Paris, France

Application December 18, 1930, Serial No. 503,266
In France December 20, 1929

3 Claims. (Cl. 74—195)

The present invention relates to apparatus adapted to indicate the speed-ratio between two shafts, by inserting between said shafts a power transmission device consisting of tangent disks, and further providing for an automatic change of speed when one shaft is to be rotated by another through the medium of the said apparatus, in which case the power furnished by the driving shaft will remain constant irrespectively of the variable load upon the driven shaft.

The invention is based upon the principle which consists in the use of a known power transmission device comprising tangent disks, but in which one of the two shafts can be moved in a direction perpendicular to the other, in such manner that the two shafts are no longer in the same plane. This motion causes secondary forces whereby a new position of equilibrium is automatically obtained.

The invention has further for its object the use of the said change-speed apparatus upon motor vehicles, with certain modifications by which a variable power may be transmitted.

The following description, with reference to the accompanying drawings, sets forth various embodiments of said invention.

Fig. 1 represents a device embodying the invention.

Fig. 2 shows a device adapted for the automatic change of speed.

Fig. 3 relates to a change-speed device adapted for use with motor vehicles.

Fig. 3a is a diagrammatical view corresponding to a different embodiment.

Fig. 4 shows a clutch apparatus.

Fig. 5 relates to one of the parts of said apparatus.

Figs. 6 and 7 show respectively an elevational and a plan view of another form of change-speed device for motor vehicles, based upon the same principle, comprising a driving wheel and two tangent disks.

Fig. 7a is a vertical axial sectional view of the device of Fig. 6 showing how reverse gear is controlled.

Fig. 8 is a plan view showing the unsymmetrical position of the disks with reference to the driving shaft.

Fig. 9 represents a clutch device.

As shown in Fig. 1, the two shafts are represented at 1 and 2, the shaft 1 being perpendicular to the plane of the figure, whilst the shaft 2 is movable in this plane. The shaft 1 carries a disk 3 which is secured thereto, and the shaft 2 carries a wheel 4 which is constantly tangent to the surface of the disk 3 and is slidable on the shaft 2, by the use of the groove 5. The shaft 2 is pivoted at the point A without interrupting the transmission of the motion, employing for instance for this purpose a cardan joint 6 having its center at A. O is the center of the disk 3, B the point of contact with said disk, and $r$ the radius of the wheel 4.

Let it be supposed that the shafts 1 and 2 are separately driven, and that the wheel 4 has a position on the shaft 2 such that the linear speeds of the disk and the wheel will be the same at their point of contact, i. e. the ratio $$\frac{OB}{r}$$

will be equal to the ratio between the speed of rotation of the shaft 2 and that of the shaft 1; it will be readily observed that the wheel 4 will roll without friction on the disk 3, and that the point of contact will remain stationary at B. But if the speed ratio of the two shafts should vary, the linear speeds at the point of contact will no longer be equal, and the wheel 4 will be driven in such manner that its point of contact will proceed towards C or D according as the periphery speed of the wheel 4 is larger or smaller than the linear speed of the disk at B. But when the wheel arrives at C, it is subjected, due to the disk 3, to a force acting according to CF, perpendicular to the radius OC; this force may be decomposed into a force CG acting in the plane of the wheel, and a force CH acting parallel to its axis; the force CG produces a torque which is added to the driving torque acting upon the shaft 2, whilst the force CH causes the wheel to slide along the said shaft, thus moving away from the point O, but as the linear speed of the disk increases as we proceed from O, there will be a new equilibrium when the wheel is at a point K such that the ratio $$\frac{OK}{r}$$

will be equal to the new speed ratio between the shafts 1 and 2. Inversely, when the wheel reaches the point D, the disk exercises upon said wheel a force DL which may be decomposed into a force DM parallel with the wheel, and a force DN having the axial direction; the force DM produces a torque which is aded to the driving torque acting upon the shaft 2, whilst the force DN causes the wheel 4 to slide upon the shaft 2 and to approach the point O, thus producing a new equilibrium when the wheel reaches P, such that the ratio $$\frac{OP}{R}$$

will be equal to the new ratio between the speeds of the shafts 1 and 2.

It will result from the preceding considerations that if the shafts 1 and 2 are separately driven, the position of the wheel 4 on the shaft 2 will indicate the ratio of the speeds of the two shafts, which is proportional to the length OB.

The said device can be employed in the first place in the automobile industry, in order to observe the exact time at which the intermediate shaft between the engine and the change-speed box, on the one hand, and the shaft leading to the rear axle, on the other hand, rotate at such speeds that the speed gears can be properly engaged. For this purpose, one of these shafts will drive the disk 3 and the other the wheel 4. This latter will move before a graduated scale upon which are marked the positions corresponding to the different speed ratios afforded by the gearing in the box; the driver first brings the change-speed lever to the dead center, and can then observe the exact time at which he can change over to another speed.

It is quite evident that there is no obligatory relation between the absolute values of the speeds of the shafts 1 and 2, on the one hand, and of the shafts with which they are connected, on the other hand; it is simply necessary that they should be connected together by power transmission devices having a determined ratio. This consideration allows a great latitude in the use of the device, and it will be an easy matter to find an arrangement enabling the optional use of a known apparatus such as the tachometer.

It will be now supposed that the shafts 1 and 2 are no longer separately driven, and that the disk 3 and the wheel 4 serve as a power transmission device between a driving shaft, for instance the shaft 1, and a driven shaft such as the shaft 2, and that the wheel is applied upon the said disk with a pressure sufficient to prevent all slipping of the wheel upon the disk. A force Q will be set up at the point of contact whose direction is that of the motion of the disk, and its value is such that the action of said force may overcome the force of the load torque S, the wheel being thus rotated without slipping, and hence rotating the shaft 2, i. e. a force such that $Qr=S$. But this force Q will also tend to move the wheel from B to D, by reason of the above-mentioned effect, and to slide the wheel on its shaft to the left, without reaching a position of equilibrium. But the case will not be the same if we apply to the wheel 4 or to the shaft 2 a force R perpendicular to said shaft and passing through its axis. In this case, equilibrium will be attained when the wheel is in a position B for which the force R has a value such that $R=Q$, i. e.

$$R=\frac{S}{r}.$$

If $a$ is the angular speed of the disk, the power transmitted will be $$W=a\cdot\frac{S}{r}\cdot OB=a.R.OB.$$

If this power is to be constant and if the speed of the disk $a$ is to remain constant, it will suffice that R.OB shall be constant, i. e. that R shall be inversely proportional to OB. Fig. 2 is an example of an arrangement by which such a force can be obtained. A rod 7 is provided which is parallel with the position of equilibrium of the shaft 2, said rod being pivoted at a stationary point 8 located on a line perpendicular to the shaft 2 and drawn through O. Upon the said rod is slidable a fork whose two prongs surround the wheel 4, and in these are provided bearings in which the wheel hub 10 is rotatable. A spring 11 bears against the end of the rod 7 and thus a force R perpendicular to the shaft 2 and having the proper direction may be imparted to this shaft by means of the said fork.

If T is the tension of the spring 11, in the position of equilibrium of the shaft 2, the fork will impart to the latter a force such that $R.OB=T.l$, if $l$ is the length of the rod 7 between its pivoting point and the spring 11. It is observed that the necessary condition (or R.OB to have a constant value) is thus obtained.

The operation of the change-speed device can be readily understood from what precedes.

If the load torque should vary, the force Q produced at the point of contact will correspondingly vary, and will no longer be counterbalanced by the force R. If the load torque increases, Q will now prevail, and the wheel will be moved towards D while sliding on its shaft and approaching the center of the disk; but during this motion, the force R increases, and a point will be reached at which a new equilibrium is obtained; this is the point at which the power imparted will resume the constant value W. The movement has reduced the speed of the shaft 2, and thus the power imparted will remain constant in spite of the variations of the load torque. If the load torque diminishes, Q also diminishes, and the force R now prevails and moves the wheel towards C, thus sliding it on the shaft 2 and withdrawing it from the center of the disk; during this motion, the force R diminishes, and a new equilibrium is obtained. The movement has increased the speed of the shaft 2, so that the imparted power remains constant.

The figures show a strap 12 adapted to guide the shaft 2 in its pivoting movements, and to hold the wheel 4 against the disk 3 with a sufficient force.

For this purpose, it is necessary to guide the fork 9, in the vicinity of the shaft 8, by a cam of suitable outline, so that the wheel 4 may move beyond the center O.

For the use of the change-speed device upon motor vehicles, I employ two driven shafts, each provided with a power transmission roller which is tangent to the disk secured to the driving shaft. One advantage obtained by this arrangement consists in the use of two such rollers instead of one, thus increasing the power transmitted for a given force exercises at the point of contact by the driving disk upon one of the driven rollers. A second advantage is due to the fact that the two transmissions to the two driven shafts are distinct, and thus if these shafts transmit the power to two driving wheels, these latter will be driven independently of one another by the automatic speed-changing device, so that the apparatus will also serve as a differential.

The invention secondly relates to a modification of the apparatus hereinbefore described and represented, which was only concerned with the case in which it was desired to transmit a constant power. When employed upon motor cars, the transmitted power should be varied, so as to remain in all cases equal to the power supplied by the engine, which is itself variable, but the principle of the power transmission is in no wise changed. It has been observed that it was necessary to apply to a transmitting roller a force R parallel with the driving disk, perpendicular to the corresponding driven shaft and meeting this shaft, in order to counterbalance the force tending to move the roller in the direction of rotation of the disk. It was further observed that the value of the force R to be applied will depend upon the transmitted power W, upon the angular speed $a$ of the driving disk, and on the position of the roller upon the driven shaft. Hence if the transmitted power is variable, the force R must vary with this power and proportionately to the same. This result can be obtained by applying this force by means of a fluid which is compressed by the engine and whose pressure will be proportional to the power supplied by the engine; said fluid may consist of oil taken from the pressure lubricating conduits, or preferably of the exhaust gas. However, provision must be made for the case in which the transmitted power becomes negative, that is, the case in which the transmission is reversed, the engine being driven by the kinetic energy of the vehicle. This may take place if there is a breakdown of the engine, or even if the fuel ceases to be supplied to the engine, for instance on a steep descent, and in this event the engine acts as a brake. Herein the force R must be reversed and also reduced, as the transmitted power required to drive the engine will always be small.

I further provide, according to the invention, a clutch device combined with the change-speed device; for uncoupling purposes, the transmission by the tangent disks need simply be thrown off, which can be done by ceasing to apply the transmitting rollers against the driving disk.

The drawings show by way of example two forms of the device which can be employed upon motor vehicles.

As shown in Fig. 3, 3 is the driving disk mounted on the shaft 1; the driven shafts are represented at 13 and 14, and are adopted to pivot at the points A and T in a plane parallel with the plane of the disk 3, due to cardan joints whose centers are at A and T. The shafts 13 and 14 carry power-transmitting rollers 15 and 16, slidable along the shafts 13—14, as above disclosed. The hub of each roller 15—16 is journaled in the two branches of forks 17—18 which are slidable on the separate rods 19—20, these being pivoted at a fixed point 29 situated on the line perpendicular to the shafts 13—14 and passing through the center of the disk O. The pistons 21—22 are provided with rods 23—24 which are respectively mounted at the ends of the rods 19—20 whose length is $l$ and impart to the rollers 15—16 (through the medium of forks 17—18) forces R—S perpendicular to the shafts 13—14 and having the proper direction. The pistons 21—22 are movable in cylinders 25—26 containing a fluid which is compressed by the engine.

It has been already observed that it is necessary to have: $w=a.R.OB$. According to the chosen arrangement, $R.OB=T.1$ if T is the force exercised by the piston 25 at the end of the rod 19 whose length is $l$. This gives the equation $W=a.T.l$. The force T must thus be proportoinal to $$\frac{W}{a},$$

i. e. to the work performed by the engine at each revolution. A satisfactory result can be obtained by producing this force T by means of a fluid compressed by the engine and acting in the cylinders 25—26. The rollers 15—16 rotate in the contrary direction, and thus the force S on the roller 16 and the force R will have contrary directions, as shown in Fig. 3.

As stated, it is of interest to employ an arrangement for reversing the directions of the forces R and S, while also reducing them; such a device may consist simply of two springs 27—28 of suitable power, mounted in the cylinders 25—26 in such manner that their action is contrary to that of the compressed fluid; thus, as soon as the fluid ceases to be supplied to the cylinders, the forces R and S are reversed.

For the coupling and uncoupling action, the necessary pressure of the rollers on the disk is obtained by means of a piston 52 (Fig. 4) acting through the medium of a bar 53 upon the ends of the two rods 54—55 which are pivoted together at V; said rods extend through a second branch of the respective forks 17—18, of which a side view is shown in Fig. 7. As this second branch is perpendicular to the first, the force of the piston will tend to apply the said rollers against the disk, and the force of this application will be inversely proportional to the distance between the rollers and the center of the disk, that is, in all positions of the rollers, it will be proportional to the force of the couple they transmit; this obviates all slipping of the rollers upon the disk. The said piston is movable in a cylinder 56 employing the same fluid as is used in the regulating cylinders. On the fluid delivery pipe 57 is mounted a valve 58 under the control of the uncoupling pedal, and when opened, said valve will assure the uncoupling by cessation of the force applying the rollers to the disk.

In the second example, shown in Figs. 6 and 7, the roller 59 is the driving element, and the two disks 60 and 61 are the driven elements. A spring 62 exactly counterbalances the weight of the disks and of the movable parts of the driven shafts, as far as the cardans. The driving torque is counterbalanced by the action of a fluid compressed by the engine and acting on pistons 21 and 22 fitted in cylinders 25 and 26. Said pistons are connected to rod 65 through rods 23 and 24 jointed to the ends of said rod 65.

In order to permit reversing the direction of the force transmitted by said rods 23 and 24, and also to reduce said force, two springs 27 and 28 are mounted in cylinders 25 and 26 respectively so as to oppose the displacements of pistons 21 and 22 under the action of the compressed fluid. In this way as soon as fluid ceases to be supplied to the cylinders, the force transmitted by rods 23 and 24 are reversed.

The contact of roller 59 with discs 60 and 61 is ensured by means of a spring 66.

When the load torque decreases, the disks are moved in a direction parallel with the plane of the roller, one disk upwardly and the other downwardly, thus moving the roller along its shaft towards the center of the disk, so that it passes from position 59 to position 67, in which the speed of rotation of the disks is increased (Fig. 7). The contrary action takes place when the load torque increases.

Independently of this motion of the disks in a plane parallel with that of the roller, said disks may also move in a direction parallel with the driving shaft, and thus when the car is making turns, the load torques of the two driving wheels become unequal and the disks have unsymmetrical positions of equilibrium with reference to the roller, as shown in Fig. 8.

A reverse gear will be obtained by bringing the roller, through suitable mechanical means, beyond the centers of the disks, in the position shown in dot-and-dash lines at 68. Such mechanical means have been shown by way of example in Fig. 7a. Roller 59 is slidably mounted on its axis 59¹. On each side of said roller is provided a forked member 100 or 101, guided on a stationary rod 102 in a direction parallel to said axis. Each forked member 100 or 101 is connected to a control member such as a cable 103, guided by pulleys 104 and 105, the displacements of said cable being controlled by a handle 106 or the like. As soon as the roller 59 has been brought in the required position by the movement of the corresponding forked member, this latter is returned to its initial position by the action on the corresponding control member.

To uncouple the device, suitable means are employed to remove the rods EI and JK which normally hold the disks against the roller by means of the spring 66. The coupling action is afforded by a differential cylinder supplied with the exhaust gas. Such an arrangement is shown in Fig. 9. The points I and K are pivoted to the rods of the differential pistons 69—70 which are movable in a double-bore cylinder; the smaller surface of this double piston is subjected to the pressure of the exhaust gas delivered through pipe 71. This pipe 71 opens into the exhaust pipe 80 of the engine. The ends of the cylinder are connected with a chamber 72 by rather large pipes, whilst the said chamber is connected with the center of the cylinder by a somewhat narrow pipe 73. In the chamber 72 is a discharge aperture of some size which is controlled by a valve 74 under the driver's control. When the driver opens the said valve, he removes all pressure from the ends of the cylinder, while at the same time a certain pressure is maintained at the center, due to the short length of the pipe 73, and thus the points I and K are at once moved apart, whereby the device will be uncoupled. When the driver allows the valve 74 to close, the pressure is again exercised in the large cylinders at the ends of the apparatus, and their action thus preponderates, thus bringing the disks towards one another, and thereby throwing on the clutch.

Obviously, the forms of construction hereinbefore described and represented in the accompanying drawings are not of a limitative nature, and are susceptible of numerous modifications without departing from the principle of the invention. As an example, instead of employing a compressed fluid in order to act upon pistons such as 21, 22, etc., I may utilize the vacuum produced in an engine and this vacuum will act upon the corresponding surface of said pistons as shown in Fig. 3a.

I claim:

1. An apparatus of the type described, which comprises in combination, a driving shaft having a fixed axis of rotation, an intermediate shaft, a driven shaft having a fixed axis of rotation, universal coupling means for connecting said intermediate shaft to said driven shaft, a friction element rigidly keyed to one of the two first mentioned shafts, a circular friction element slidably keyed on the other of said two first mentioned shafts, means for maintaining the last mentioned friction element in tangential contact with the surface of the first mentioned friction element, and yielding means for imparting to the point of the intermediate shaft where the friction element carried thereby is positioned a force inversely proportional to the distance from said last mentioned element to the axis of the driving shaft so as to oppose rotation of the intermediate shaft with respect to the driven shaft under the effect of the engagement of said friction elements, the last mentioned means including a cylinder, a piston in said cylinder, and means for feeding a fluid compressed by the engine to said cylinder.

2. An apparatus of the type described, which comprises in combination, a driving shaft having a fixed axis of rotation, two intermediate shafts, two driven shafts having fixed axes of rotation respectively, which are substantially in line with each other, universal coupling means for connecting said intermediate shafts to said driven shafts respectively, a friction disc rigidly keyed to each of said intermediate shafts respectively, a friction roller slidably keyed on said driving shaft between friction discs respectively, an articulated frame having two members for supporting the ends of said intermediate shafts that are close to said discs respectively, elastic means for supporting the whole of said intermediate shafts, friction discs and frame, elastic means for urging said members against each other so as to maintain said friction roller in tangential contact with the surfaces of both of said friction discs, and elastic means for opposing rotation of the intermediate shafts with respect to their driven shafts under the effect of the engagement of said friction elements.

3. An apparatus of the type described, which comprises in combination, a driving shaft having a fixed axis of rotation, two intermediate shafts, two driven shafts having a common fixed axis of rotation substantially at right angles to the axis of rotation of said driving shaft, universal coupling means for connecting said intermediate shafts to said driven shafts respectively, a friction disc rigidly keyed to each of said intermediate shafts, a friction roller slidably keyed on said driving shaft between said friction discs, means for maintaining said roller in tangential contact with the surfaces of both of said two friction discs, and elastic means for opposing rotation of the intermediate shafts with respect to their driven shafts under the effect of the engagement of said friction elements, the means for maintaining said roller in tangential contact with the surfaces of both of said discs comprising two cylinders, two pistons in said cylinders respectively, means for transmitting to said discs the displacements of said pistons relatively to said cylinders respectively, means for feeding exhaust gases from the engine to said cylinders, the device further comprising means for stopping the action of said gases on said pistons and elastic means opposing the movements of said pistons in said cylinders under the action of the exhaust gases.

PIERRE BARTHELEMY.